Dec. 9, 1941.  G. J. STREZYNSKI  2,265,459
CENTRIFUGAL BOWL
Filed March 28, 1939  2 Sheets-Sheet 1

WITNESS:
Rob't R. Kitchel

INVENTOR
George J. Strezynski
BY
Busser and Harding
ATTORNEYS.

Dec. 9, 1941.  G. J. STREZYNSKI  2,265,459
CENTRIFUGAL BOWL
Filed March 28, 1939  2 Sheets-Sheet 2

WITNESS:

INVENTOR
George J. Strezynski
BY
Buseur and Harding
ATTORNEYS.

Patented Dec. 9, 1941

2,265,459

UNITED STATES PATENT OFFICE 2,265,459

CENTRIFUGAL BOWL

George J. Strezynski, Poughkeepsie, N. Y., assignor to The De Laval Separator Company, New York, N. Y., a corporation of New Jersey Application March 28, 1939, Serial No. 264,523

16 Claims. (Cl. 233—29)

My invention is an improvement in centrifuges for the concentration, from a carrying serum, of materials which have a tendency to coagulate when overconcentrated or when dried. Examples of materials of this class are rubber latex and similar plant juices.

The object of my invention is the provision of a centrifugal bowl which will have a greater capacity than previously made bowls and will consistently continuously discharge the concentrate in a more concentrated condition and at the same time leave a smaller quantity of solids in the discharged serum.

There are two ways of increasing the separating capacity of a centrifugal bowl; one by increasing the diameter and the other by increasing the length. Increase in diameter is limited by the strength of available materials. Increase in length beyond a certain rather short limit results in unequal flow through the different inter disc spaces.

It is known to divide the frusto-conical discs in a bowl into two groups with their large ends together or closely approximating and feed the mixture to be separated to the space between the two groups. One example of such a construction is disclosed in an application filed by me December 2, 1937, Serial No. 177,688. With this construction each group of discs is half the height of the total number and the inequality is much less. I have found, however, that there is a tendency to feed much more mixture to the lower than to the upper group of discs. I have succeeded in overcoming this tendency by providing, on the central feeding member, generally called a tubular shaft, an even number of circumferentially spaced pockets alternately feeding the upper and the lower groups of discs.

Even with short groups of discs there is a tendency to discharge too much liquid from the outer edges of the discs that are nearest the feed end of the group. To overcome this tendency I have provided a taper bored ring around such discs.

If air is allowed to circulate over the surface of the concentrate it has a tendency to dry it and increase its tendency to adhere to any surfaces with which it comes in contact, causing irregularity in flow and non-uniformity in the product. The invention includes means to prevent such drying.

Figure 1:
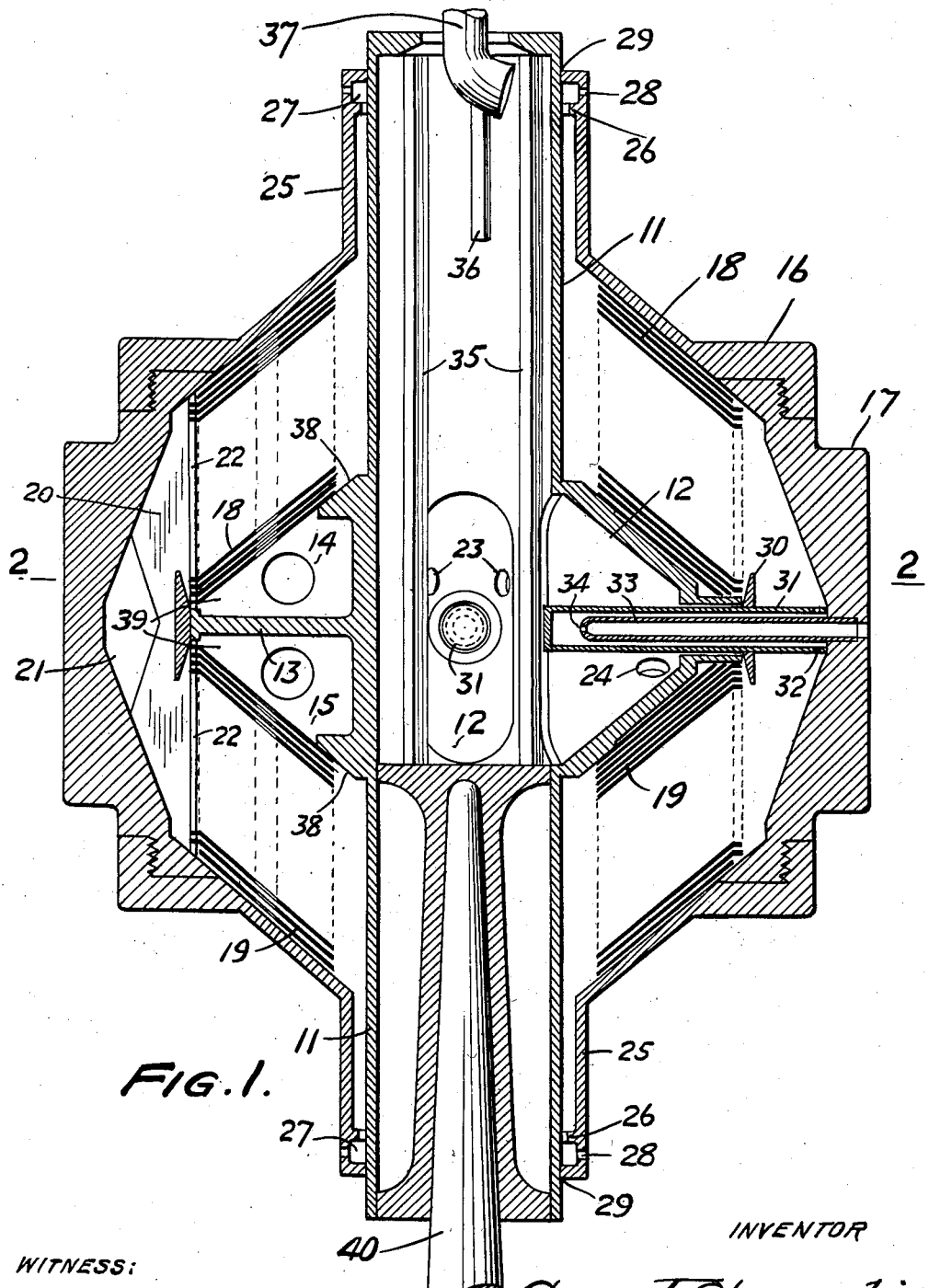
Figure 2:
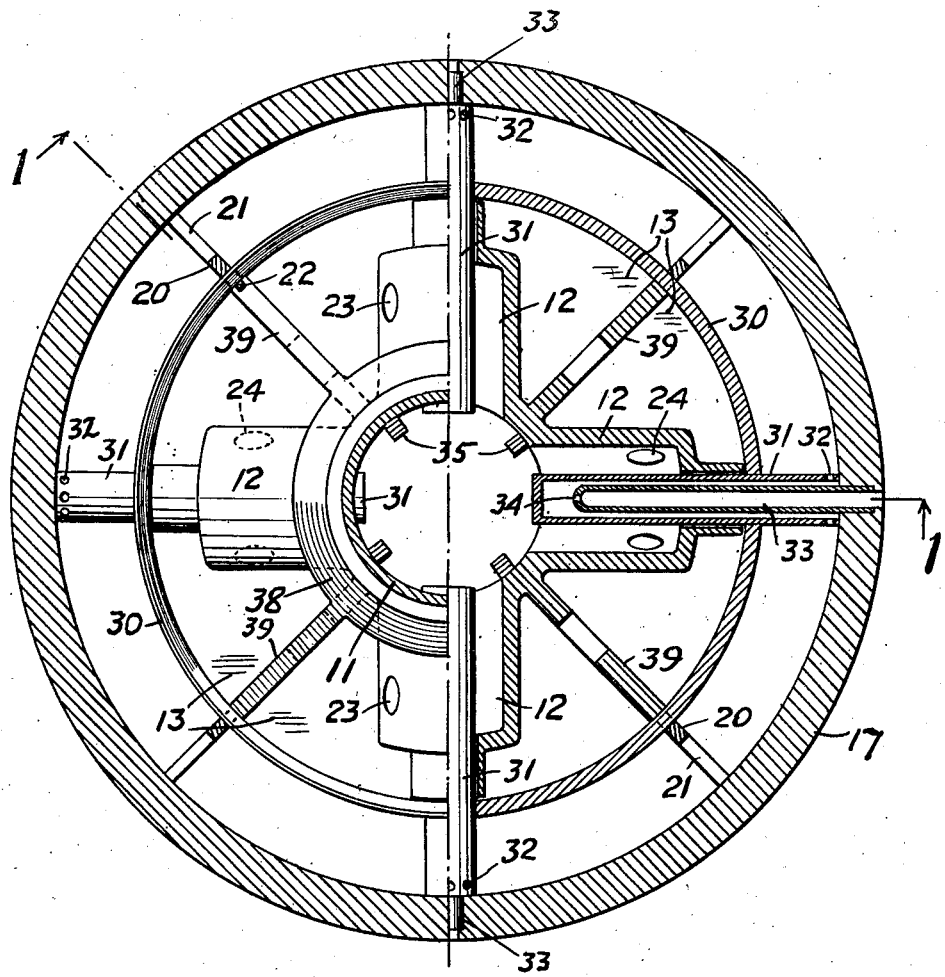

In the accompanying drawings, which illustrate an embodiment of my invention:

Fig. 1 is a vertical longitudinal section on line 1—1 of Fig. 2, and Fig. 2 is a transverse section on line 2—2 of Fig. 1 partly broken away.

Except for a driving and supporting spindle and its connection to the lower part of the bowl, the bowl is symmetrical about its center of length as well as about its axis of rotation.

The central tubular shaft 11 has an equal number (four in the drawings) of radially extensive pockets 12 projecting therefrom and between the pockets a horizontal partition 13 separating the space around the central tubular shaft into an upper chamber 14 and a lower chamber 15.

Above the pockets 12 and clamped to them by the head 16 of the bowl shell 17 is a group of frusto conical members 18, known in the art as "discs." Below the pockets another similar group of discs 19 is clamped against the pockets by the opposite head of the bowl. In each group of discs the one nearest the center of length of the bowl fits tightly against an annular conical surface 38 around the central tubular shaft and is otherwise supported on vertical vanes 39 arranged in the bowl intermediate the pockets 12. These discs are guided at their peripheries by vertical ribs 20 in the bowl shell each of which has a hole 21. One of the ribs 20 has a key 22 that, by fitting notches in the discs, insures their correct circumferential location.

Two of the pockets 12 have holes 23 which feed liquid to the upper chambers 14 from which it flows through conventional distributing holes in the upper discs 18 to the interdisc spaces. The other two pockets have similar holes 24 which, through the lower chambers 15, feed the interdisc spaces of the lower group 19.

The bowl top at each end has a neck 25 with a discharge controlling ring 26 substantially smaller than the neck but substantially larger than the outside of the tubular shaft 11. Beyond the ring 26 is an annular trough 27 with several slots 28 therethrough and, beyond the slots an inturned flange that fits closely around the central tubular shaft at 29.

The central holes in the discs are, as shown, larger than the inside of the bowl neck 25 and much larger than the outside of the central tubular shaft 11 and there are no members extending into the annular space between the discs and said tubular shaft.

A ring 30 around the discs in each group nearest the feed end has its inner surface almost touching the first disc and is distant from the last one that it surrounds by about twice the distance between two discs. The ring may surround the group of discs between about 15% to 30% of the length of the group from its feed end and may be spaced from the group at its outer and larger end a distance equal to somewhat less than twice, to about four times, the space between adjacent discs.

A radial tube 31 resting against the inner surface of the bowl shell 17 at its maximum diameter has several small holes 32 leading to an annular passage between that tube and a smaller tube 33 inside it, having at its inner end, an inlet 34 and, at its outer end, an outlet through the bowl wall.

On the inner side of the central tubular shaft 11, and located at the back side, in the direction of rotation, of each pocket 12, is a liquid accelerating rib 35 and between these long ribs there are an equal number of shorter ribs 36.

A feed tube 37 extends inside the upper end of the tubular shaft and has its end bent toward one side and flattened.

In operation liquid from the tube 37 flows against the inside of the tubular shaft 11 where it is caught by the ribs 35 and 36 and caused to rotate with the bowl. It then flows down and outwardly into the pockets 12. Because the ribs 35 and pockets 12 are equally and symmetrically spaced and of the same size, the pockets all receive the same quantity of liquid and, because half of them feed the upper part of the bowl and the other half the lower part, the liquid is equally divided between the two ends.

The action is the same in both ends of the bowl and, for simplicity, the description will be confined to the upper end.

From the pockets 12 liquid flows through holes 23 into chambers 14 and thence through the distributing holes in the discs to the spaces between them where the light and heavy constituents are separated. The heavier constituent moves to the outside, passes through the holes 32 in the tube 31, then along the annular space between that tube and tube 33 to the hole 34 in the end of the tube. The length of the tube 33 is calculated, as taught by Snyder Patent 1,283,343, so that the neutral zone between the heavier and lighter constituents will be at about the center of the distributing holes in the discs. The bowl may be supported and driven in the usual manner by a vertical spindle 40.

The ring 30 around the outside of the discs nearest the feed end of the group provides a graduated throttling that largely equalizes the flow from the outside of the discs.

The lighter constituent moves toward the center and forms an annular zone which flows out over the ring 26 into the trough 27 then out through the slots 28.

The inturned flange at the end of the bowl neck 25 fits closely around the tubular shaft 11 at 29 and prevents circulation of air over the concentrate.

While the bowl and especially certain of the described details are more particularly intended for concentrating, from a carrying serum, of materials having a tendency to coagulate if overconcentrated or dried, certain features thereof, such as the means insuring equality of feed to the two groups of discs, are of value and utility when applied to centrifugal separators and purifiers intended and adapted for general or other uses.

What I claim and desire to protect by Letters Patent is:

1. A centrifugal bowl enclosing a space in which the mixture is centrifuged, an axial tubular feed shaft communicating with said space, a group of longitudinally spaced discs within said space and surrounding the feed tube, and means to retard excessive flow from between the discs nearest the feed, said means comprising a ring surrounding the discs nearest the feed and having a tapered bore with its end of smaller diameter only slightly larger than and adjacent to the exterior of the disc nearest the feed end of the group and its end of larger diameter surrounding a disc substantially nearer to the feed end of the group than to the opposite end of the group.

2. A centrifugal bowl as defined in claim 1 in which the larger diameter end of the ring is spaced from the edge of the last named disc a distance substantially greater than the space between two adjacent discs.

3. A centrifugal bowl as defined in claim 1 in which the larger diameter end of the disc surrounds a disc position between 15% and 30% of the length of the group from the feed end thereof and distant from said disc between about two to four times the space between adjacent discs.

4. In a centrifugal bowl for concentrating, from a carrying serum, materials having a tendency to coagulate, an axial tubular feed shaft, two groups of discs in said bowl arranged along different lengths of the axis of the bowl, said bowl having a serum outlet between its ends and provided at opposite ends thereof with necks surrounding and spaced from the tubular shaft and provided with discharge rings of substantially greater diameter than the outside diameter of the tubular shaft and of substantially smaller diameter than the inside diameters of the bowl necks and the group of discs.

5. A centrifugal bowl in accordance with claim 4 comprising also guiding means engaging the groups of discs at their outer edges, the annular spaces between the inner edges of the discs and the tubular feed shaft being unobstructed by any elements projecting through the inner surface of the concentrate.

6. A centrifugal bowl in accordance with claim 4 comprising tight closures between the bowl neck and tubular shaft beyond the discharge rings.

7. A centrifugal bowl in accordance with claim 4 comprising also a trough beyond each discharge ring having peripheral outlets for escape of concentrate but closed against admission of air.

8. In a centrifugal bowl having an axial tubular feed shaft into which the material to be separated is fed, said bowl enclosing two annular separating chambers spaced apart along the axis of the bowl and having midway between them a common discharge for the heavier separated constituent, the improvement which comprises means providing equality of feed from the tubular shaft to the two separating chambers, said means comprising an even number of distributing pockets of similar size arranged symmetrically around the feed shaft and communicating therewith along the same length thereof and at equal distances from the axis one half of which feed only one separating chamber and the other half of which feed only the other separating chamber.

9. A centrifugal bowl in accordance with claim 8 in which the pockets are not less than four in number and in which the pockets communicating with one chamber alternate with the pockets communicating with the other chamber.

10. In a centrifugal bowl having an axial tubular feed shaft and enclosing two annular separating chambers spaced apart along the axis of the bowl, and two sets of annular frusto-conical discs in the respective chambers having distributing orifices between their inner and outer edges, one set of discs being inverted relatively to the other, all the discs of both groups being of uniform diameter with their inner and outer edges in alignment in the direction of the axis of the bowl, the orifices of the discs of each group being in alignment along lines extending parallel to the axis of the bowl, the improvement which comprises means providing substantial equality of feed from the feed shaft to the two separating chambers, said means including pockets of similar size located symmetrically around the feed shaft between the two separating chambers and communicating therewith along the same length thereof, and one of which communicates with the disc orifices of only one separating chamber and the other of which communicates with the disc orifices of only the other separating chamber.

11. A centrifugal bowl in accordance with claim 10 in which the pockets are not less than four in number and in which the pockets communicating with one chamber alternate with the pockets communicating with the other chamber.

12. A centrifugal bowl in accordance with claim 8 in which the width of the communicating openings between the feed tube and the pockets, measured circumferentially of the feed tube, substantially exceeds the distance, similarly measured, between adjacent pockets.

13. A centrifugal bowl in accordance with claim 8 in which the width of the communicating openings between the feed tube and the pockets, measured circumferentially of the feed tube, substantially exceeds the distance, similarly measured, between adjacent pockets, and longitudinally extending accelerating ribs on the inside of the tubular shaft corresponding in number to said pockets and extending adjacent to corresponding edges thereof.

14. A centrifugal bowl in accordance with claim 8 in which the width of the communicating openings between the feed tube and the pockets, measured circumferentially of the feed tube, substantially exceeds the distance, similarly measured, between adjacent pockets, and longitudinally extending accelerating ribs on the inside of the tubular shaft corresponding in number to said pockets and extending adjacent to corresponding edges thereof, and additional longitudinally extending accelerating ribs on the inside of the tubular shaft shorter than and arranged between the first named ribs.

15. A centrifugal bowl in accordance with claim 10 having at opposite ends necks and control rings extending inward therefrom, the inner edges of each ring having a radius substantially greater than that of the outside of the feed shaft and the inner edges of the pocket walls and substantially less than that of the central holes in the annular discs, said necks beyond said rings forming troughs closed at their ends provided with discharge orifices.

16. A centrifugal bowl in accordance with claim 10 and comprising also means to retard excessive flow from between the discs of each chamber nearest the feed thereto from the pockets, said means comprising a ring surrounding only that minor proportion of the discs which is nearest the feed from the pockets to the disc orifices.

G. J. STREZYNSKI.